United States Patent [19]
Kaba

[11] Patent Number: 5,581,720
[45] Date of Patent: Dec. 3, 1996

[54] APPARATUS AND METHOD FOR UPDATING INFORMATION IN A MICROCODE INSTRUCTION

[75] Inventor: James T. C. Kaba, Jackson, N.J.

[73] Assignee: David Sarnoff Research Center, Inc., Princeton, N.J.

[21] Appl. No.: 402,311

[22] Filed: Mar. 10, 1995

Related U.S. Application Data

[63] Continuation of Ser. No. 228,482, Apr. 15, 1994, abandoned.

[51] Int. Cl.$^6$ ...................................................... G06F 9/24
[52] U.S. Cl. .......................... 395/567; 395/701; 395/477
[58] Field of Search ..................................... 395/775, 375, 395/476, 477, 405

[56] References Cited

U.S. PATENT DOCUMENTS

| | | | |
|---|---|---|---|
| H1,291 | 2/1994 | Hinton et al. | 395/800 |
| 3,889,242 | 6/1975 | Malmek, Jr. | 395/375 |
| 3,959,783 | 5/1976 | Fressineau et al. | 365/200 |
| 4,125,877 | 11/1978 | Reinert | 365/190 |
| 4,204,252 | 5/1980 | Hitz et al. | 395/775 |
| 4,217,639 | 8/1980 | Hartley et al. | 377/47 |
| 4,360,869 | 11/1982 | Stanley et al. | 395/375 |
| 4,825,363 | 4/1989 | Banmann et al. | 395/375 |
| 4,835,679 | 5/1989 | Kida et al. | 395/375 |
| 4,862,407 | 8/1989 | Fette et al. | 395/800 |
| 4,901,235 | 2/1990 | Vora et al. | 395/375 |
| 4,933,909 | 6/1990 | Cushing et al. | 365/230.05 |
| 5,144,242 | 9/1992 | Zeilenga et al. | 324/312 |
| 5,203,002 | 4/1993 | Wetzel | 395/375 |
| 5,212,693 | 5/1993 | Chao et al. | 395/182.03 |
| 5,253,062 | 10/1993 | Ohta | 348/714 |
| 5,465,361 | 11/1995 | Hoenninger, III | 395/700 |

Primary Examiner—William M. Treat
Assistant Examiner—Viet Vu
Attorney, Agent, or Firm—William J. Burke

[57] ABSTRACT

In a computer for executing a computer program, apparatus and a method for updating information within a computer program instruction without interrupting execution of the computer program. The apparatus contains a memory for storing the information within the instruction at an address within the memory, circuitry for periodically accessing the information for execution by the computer, and circuitry for altering, between periodic accesses to the memory by the accessing circuitry, the information stored in the memory. In this manner, computer program execution is not interrupted to alter the information within the instruction. Typically, the information is a data field value contained within a computer microcode instruction. Consequently, the data field value is updated, but other information within the instruction such as an operational code (OPcode), is not altered by the update operation. The apparatus and method disclosed herein find applicability in video servers, medical imaging, special effects and animation and location based entertainment systems among other applications.

17 Claims, 3 Drawing Sheets

APPARATUS AND METHOD FOR UPDATING INFORMATION IN A MICROCODE INSTRUCTION

CROSS REFERENCE TO RELATED APPLICATION

This application is a continuation of patent application Ser. No. 08/228,482 entitled APPARATUS AND METHOD FOR UPDATING INFORMATION IN A MICROCODE INSTRUCTION and filed on Apr. 15, 1994 now abandoned.

The invention relates to microcode instruction execution within a computer, and, more particularly, to apparatus and a method for updating information contained in a microcode instruction without interrupting program execution by the computer.

BACKGROUND OF THE DISCLOSURE

Generally, a computer program consists of a series of microcode instructions. Each microcode instruction typically contains an operational code field (OPcode field) and a data field. The OPcode field specifies a particular operation for the computer to perform. The data field contains either actual data upon which the instruction will operate or an address in main memory where such data is stored. In the second instance, the address points to a particular data byte which is then used (operated upon) by the instruction. Generally, this data is known in the art as the "operand" of the OPcode. For simplicity, the following discussion assumes the data field contains the actual data to be operated upon by the OPcode.

If a program requires that the data within a data field be altered during program execution, program execution is typically interrupted until the new data is stored within an appropriate data field within memory. Typically, such a data update process is accomplished by a so-called interrupt routine.

For example, consider a program that repetitively executes an instruction that adds a variable to a constant, e.g., a function having the form $Y=X+C$, where X and Y are variables and C is a constant. The instruction for this operation contains an OPcode specifying that an addition function is to be accomplished and a data field containing the constant C. In particular, the data field is used to supply the constant C as an input to an Arithmetic Logic Unit (ALU) that accomplishes the calculation, e.g., an addition function.

If the value of the constant C, i.e., the data field value, is to be altered during execution of the program, program execution is halted until an instruction updating the constant value is issued by the computer, i.e., an interrupt routine updates the constant value while the main program awaits completion of the update. Upon execution of such an interrupt routine, the data field is updated with a new value. Such an update typically requires one or more clock cycles to accomplish. After the update is completed, main program execution is resumed. Such delay in program execution adversely effects the execution speed of the computer. Moreover, such main program execution delay is especially detrimental to computers that provide real-time processing.

Therefore, a need exists in the art for apparatus and a method that updates the data field information without interrupting main program execution.

SUMMARY OF THE INVENTION

The invention overcomes the disadvantages heretofore associated with the prior art by enabling program information, e.g., a data field value within a microcode instruction, to be updated without interrupting main program execution. Specifically, the invention is apparatus and a method that updates information that a currently executing program is using. The information, temporarily stored in a memory unit, can be updated and read from that same memory unit within a single clock cycle. As such, the information update is timed to occur between the program instructions being periodically recalled from the memory unit for execution by a processing unit.

More specifically, the invention contains: a program memory unit for storing a microcode instruction at an address therein; circuitry for periodically accessing the instruction for execution by a processing unit; and circuitry for selectively altering program information within the microcode instruction stored in the memory unit. The alteration of the program information occurs between periodic accesses to the program memory that occur during program execution. As such, the program information can be updated without interrupting program execution.

BRIEF DESCRIPTION OF THE DRAWING

The teachings of the present invention can be readily understood by considering the following detailed description in conjunction with the accompanying Drawing, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in a computer that requires information within a microcode instruction to be updated without interrupting execution of the program using the information. Specifically, computers that will gain the most from utilizing the present invention are those that accomplish real-time processing.

Figure 1:
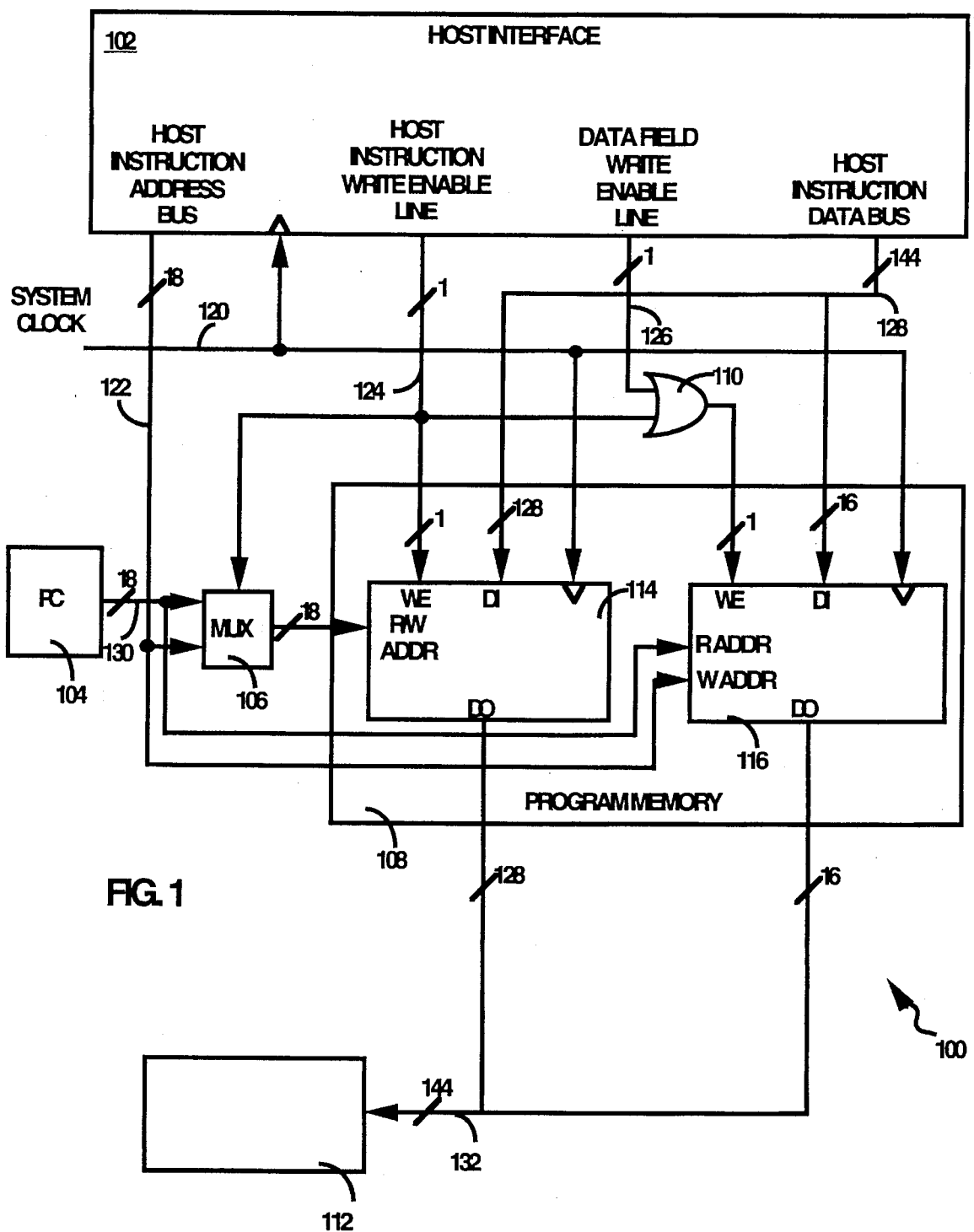
FIG. 1 depicts a block diagram of a preferred embodiment of the present invention.

FIG. 1 depicts a block diagram of the present invention as it would be implemented within a conventional computer. The preferred embodiment of the invention 100 contains a host interface 102, a program counter (PC) 104, multiplexer (MUX) 106, OR gate 110 and a program memory 108. As part of a computer containing the invention, but not forming a portion of the present invention, is a conventional processing unit 112 that executes a program stored in the program memory 108.

The host interface 102 forms an interface between the computer containing the invention and a user or programmer. Typically, the host interface is a computer terminal, microcomputer, computer workstation and the like. In response to a programmer's actions, the host interface generates a computer program. Specifically, the program contains a series of instructions wherein each instruction contains an operational code (OPcode) field and a data field. Upon execution of a given instruction, the contents of the data field forms an operand for the OPcode. As such, via the host interface, a programmer can write a program and store the instructions, as well as initial data operands, within the program memory 108. Upon program execution, the program counter (PC) 104 supplies, in a conventional manner, an appropriate instruction address sequence to the program memory 108. As such, the program counter 104 sequentially recalls the program instructions and their associated data for execution by the processing unit 110.

Specifically, the program memory 108 contains two random access memory (RAM) units 114 and 116. The first RAM 114 is a conventional single-port memory unit in which one port ("R/W addr" port) is used for both specifying a read address and a write address from/to which OPcodes are sequentially read/written. The second RAM 116 is a dual-port memory unit in which separate ports are used to specify the read and write addresses from/to which data field information is read/written. Specifically, the "R addr" port is used to specify the read address and the "W addr" port is used to specify the write address. Consequently, two addresses can be supplied to the second RAM 116 within a single clock cycle. As such, within that single clock cycle, data can both be read and written to a single address within the memory unit 116. In operation, the data field is periodically read for use by the processing unit 110, while the data field information is updated between read operations. Consequently, data field information can be updated without interrupting the execution of the program to await the data update.

More specifically, when microcode instructions of a given program are written into the program memory 108 via the host interface 102, both the OPcode field and the data field of the microcode instruction are written simultaneously. Furthermore, when the program is executing, both the OPcode field and the data field within each microcode instruction are read simultaneously from the program memory, concatenated, and routed, via instruction data bus 132, to the processing unit 112 for execution. As is well known in the art, the OPcode field and the data field form two portions of an instruction word that the processing unit subsequently executes. Using the present invention, the data field information can be updated with new data at an address specified by the host interface without interrupting execution of the program, i.e., the update occurs between program counter read address generations. Such a data field update is made possible by using the dual-port RAM as the data field memory unit 116.

In operation, the following process is used to initially load a program and each initial data field value into the program memory 108:

1) the host interface 102 writes a 144-bit wide instruction word containing both an OPcode field value (128-bits) and an initial data field value (16-bits) to the host instruction data bus 128;

2) the host interface 102 then writes an 18-bit instruction address to the host instruction address bus 122 to indicate the address at which the data field value and the OPcode field value are to be written within their respective memories 114 and 116; and 3) the host interface asserts the host instruction write enable line 124 to complete the write operation.

Assertion of the host instruction write enable line 124 routes the value of the host instruction address bus 122 through the multiplexer 106 to the "R/W addr" port of the single-port OPcode field memory unit 114. Furthermore, upon assertion of the write enable line, the value of the OPcode field on the host instruction data bus 128 is written into memory 114.

Similarly, the value of the host instruction address bus 122 is also available to the "W addr" port of the dual-port data field memory unit 116. Assertion of the host instruction write enable line 124, through OR gate 110, latches the data field value on the host instruction data bus 128 through the data input (DI) port into the data field memory unit 116.

During program execution, the program counter 104 supplies, via the multiplexer 106, each address of the instruction (both OPcode and data) to be executed by the processing unit 112. In response to the host instruction write enable line 124 not being asserted during program execution, the multiplexer 106 is set such that the instruction address supplied by the program counter 104 is available to the "R/W addr" port of the OPcode field memory unit 114 and to the "R addr" port of the data field memory unit 116. The microcode instruction (OPcode and data fields) at the specified address is written to the instruction data bus 132 through the data output (DO) port of the OPcode field memory unit 114 and the DO port of the data field memory unit 116. To fully execute a program, the program counter 104 issues a sequence of instruction addresses which sequentially recall instructions to be executed by the processing unit 112.

Figure 2:
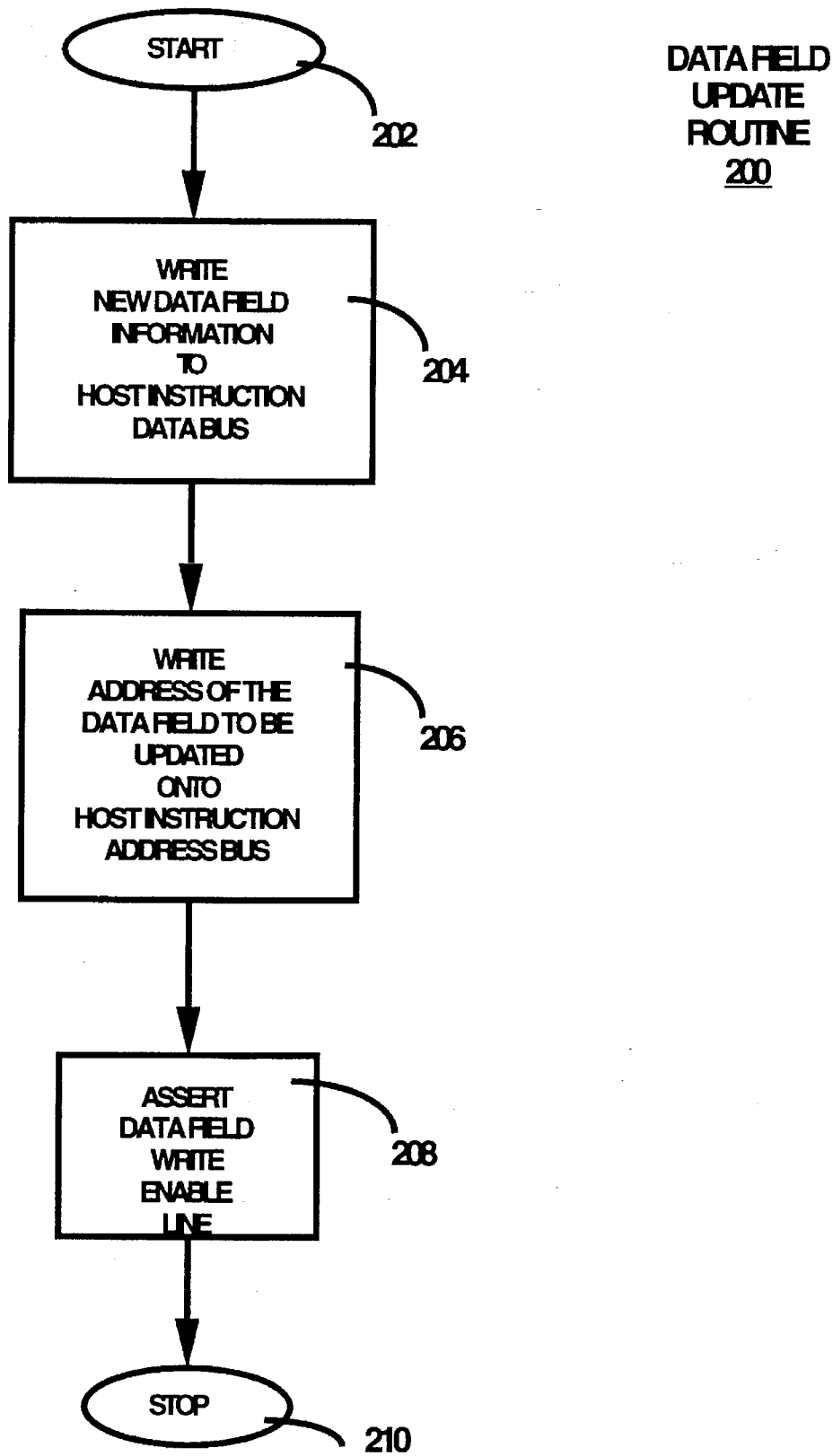
FIG. 2 depicts a flow chart of a data field update routine.

To update a data field within the data field memory unit during program execution and without halting execution of the program, the invention accomplishes a number of methodical steps. FIG. 2 depicts a flow chart of a routine 200 executed by the host interface to update the contents of a particular data field. Such a routine can be implemented in either hardware or software. For the reader to best understand the operation of the invention, it is suggested that FIGS. 1 and 2 be simultaneously consulted while reading the following discussion.

The data field update routine 200 is generally entered at step 202, labeled START. Subsequently, at step 204, the routine writes the new data field value onto the host instruction data bus. The routine then writes, at step 206, the address of the data field to be updated onto the host instruction address bus. At step 208, the routine asserts the data field write enable line to effectuate writing the new data field value into the data field memory unit at the specified address. The routine stops at step 210. This entire process occurs between memory accesses used to read the data field value for use in program execution.

More specifically, assertion of the data field write enable line 126 through OR gate 110, causes the new data field value on the host instruction data bus 128 to be latched through the DI port of the data field memory unit 114 and written to the address specified at the "W addr" port. Since, at this time, the host instruction write enable line 124 is not asserted, the multiplexer 106 does not apply the address on the host instruction address bus 122 to the OPcode field memory unit 114. In this manner, data field information is updated between instruction recalls and the OPcode field information is not altered by the data field information update. Advantageously, execution of the program is not interrupted to update the data field information.

Importantly, the memory unit 116 can write information at a different time within a system clock cycle (line 120) than it reads information. Specifically, as shown in the timing diagram of FIG. 3, input data is written to the dual-port memory unit at the beginning of a system clock cycle and output data is available to be read from the memory unit at the end of a system clock cycle. As such, a program is executed by reading data field information from the dual-port memory unit once per clock cycle, i.e., at the end of a clock cycle. However, in accordance with the invention, that information can be updated at the beginning of a clock cycle without the periodic information access process being affected, i.e., without affecting program execution.

Figure 3:
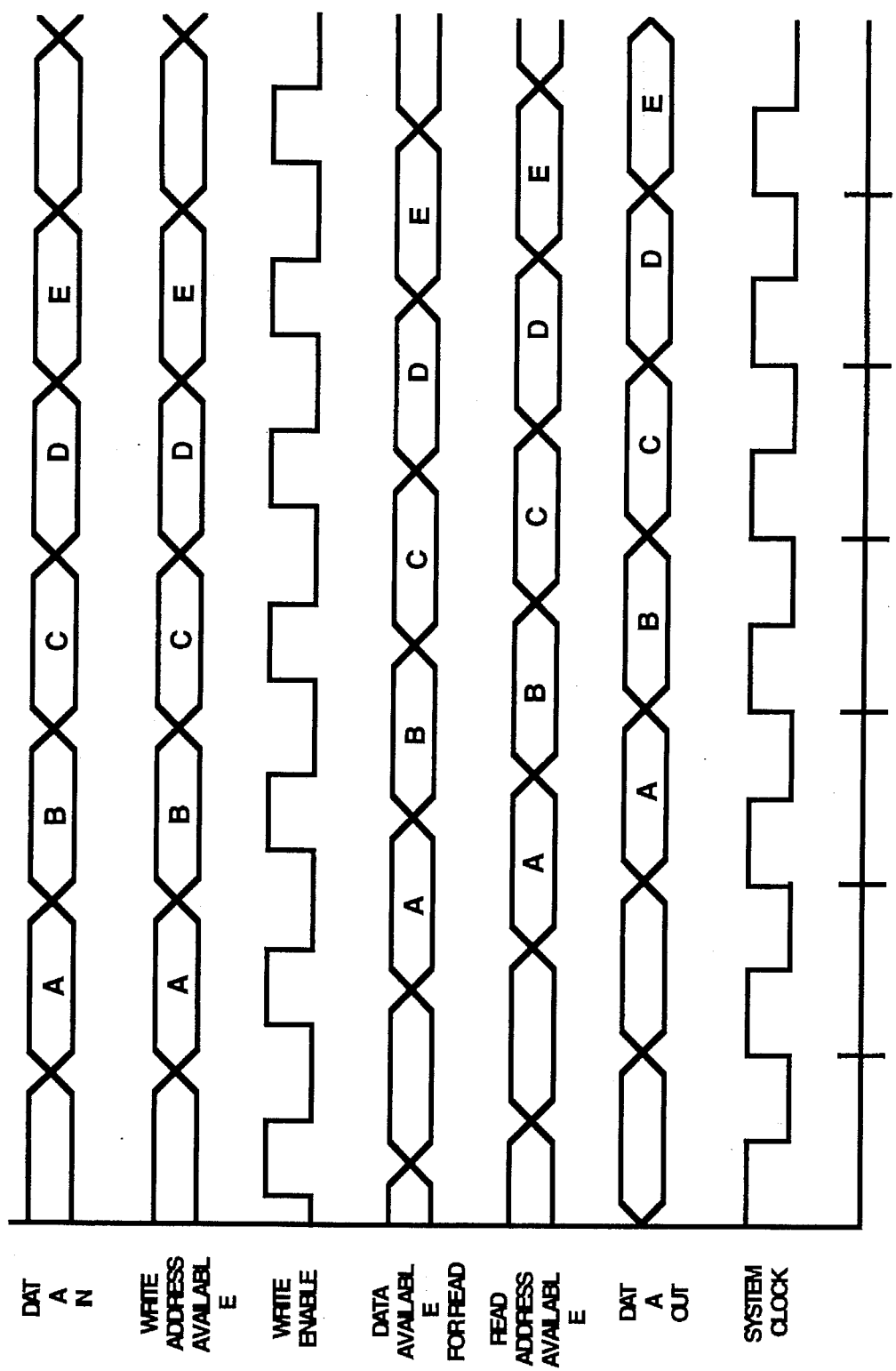
FIG. 3 depicts a timing diagram of signals used to read and write data to a dual-port memory unit.

More specifically, as shown in FIG. 3, to write new data (for example, data A) and read data A within a single clock cycle, data A is applied to the data input (DI) port of the memory unit while the address to which that data is to be written is applied to the "W addr" port of the memory unit. Once the write address and the data are present, the host interface asserts the data field write enable line (write enable signal in FIG. 3) and the data is written to the designated write address location within the memory unit. After a relatively short period of time during which the newly written data is not valid, i.e., after a settling time, a read address is applied to the "R addr" port of the dual-port memory unit. The read address can be, but is not necessarily, the same address as the write address used to store data A.

Upon deassertion of the data field write enable line, the data (data A) is read from the memory address presently applied to the "R addr" port, i.e., data A is read during the same clock cycle that the data is written to memory. This data is latched in a buffer register within the memory unit and then sent as an output of the data output (DO) port upon occurrence of the next clock cycle. In this manner, the data at any location within the memory unit can be written and read within a single clock cycle. As such, within the next clock cycle, i.e., while data A is being produced as an output at the DO port, data B can be updated and read from the memory unit. Subsequently, data within the memory unit can be updated with each new clock cycle. Consequently, using the present invention, data, e.g., data B, C, D, E, and so on, can be selectively updated at particular addresses within the memory unit without interrupting the periodic data accesses at the end of each clock cycle, i.e., without interrupting program execution.

In the forgoing example, information in a data field is updated and, within a single clock cycle, that updated data is read from the memory unit. However, the information at a specific memory location may be updated between periodic accesses to the memory unit, although that updated data might not be accessed until some time later during the program execution. Although access to the updated data is delayed until a later clock cycle, the invention updates the data without interrupting program execution, i.e., the update is performed between the periodic accesses to memory unit. Consequently, in accordance with the invention, the data field information of a microcode instruction is updated without interrupting program execution.

FIG. 3 provides a general indication of the relative timing of the various signals that control the dual-port memory. However, these signals are intended for illustrative purposes only. Therefore, to implement the invention, the reader should consult the device specification for the specific dual-port memory that will be used to implement the invention. An illustrative dual-port memory unit capable of performing the functions necessary to implement the present invention is model CY7C130/CY7C131 manufactured by Cypress Semiconductor of San Jose, Calif.

Throughout the foregoing disclosure, the data field was discussed as if it contained an actual data value. Alternatively, the data field may contain an address within main memory or an address of a specific register within the computer that contains the actual data value. As such, the data field update would alter this address information at which the new data can be found rather than update the data value itself.

Although one embodiment which incorporates the teachings of the present invention has been shown and described in detail herein, those skilled in the art can readily devise many other varied embodiments that still incorporate these teachings.

The apparatus and method disclosed herein find applicability in video servers, medical imaging, special effects and animation and location based entertainment systems among other applications.

What is claimed is:

1. In a computer system for execution of a computer program, apparatus for updating data field information within a microcode instruction that comprises a portion of the computer program without interrupting execution of said computer program, said microcode instruction contains an operation code field defining operations code information and a data field defining data field information, said apparatus comprising:

first memory means for storing said operations code information at an address within said first memory means;

second memory means for storing said data field information at an address within said second memory means;

means, connected to said first and second memory means, for periodically accessing said operations code information and said data field information to form a microcode instruction for use by said computer system; and means, connected to said second memory means, for altering, between periodic accesses to said second memory means by said accessing means, said data field information stored in said second memory means wherein said computer program execution is not interrupted to alter said data field information.

2. The apparatus of claim 1 wherein said second memory means further comprises a dual-port memory unit.

3. The apparatus of claim 2 wherein said dual-port memory unit further comprises:

a first port for accepting a read address from said accessing means;

a second port for accepting a write address from said accessing means;

a data input port for accepting data field information from said altering means;

a data output port for supplying said data field information located at said read address to said computer system; and a write enable port that, when asserted, stores said updated data field information at said input port at a location defined by the write address at said second port to update said data field information presently stored at the write address.

4. The apparatus of claim 3 wherein said read address and said write address are the same address.

5. The apparatus of claim 3 wherein said read address and said write address are not the same address.

6. The apparatus of claim 1 wherein said first memory means further comprises:

single-port memory means for storing operations code information contained in said microcode instruction; and wherein said second memory means further comprises:

dual-port memory means for storing said data field information contained in said microcode instruction, wherein said data field information is alterable between periodic accesses to said first and second memory means.

7. The apparatus of claim 6 wherein said dual-port memory means further comprises:

a first port for accepting a read address from said accessing means;

a second port for accepting a write address from said accessing means;

a data input port for accepting said data field information from said altering means;

a data output port for supplying said data field information located at said read address to said computer system; and a write enable port that, when asserted, stores said data field information at said input port at a location defined by the write address at said second port to update said data field information presently stored at the write address.

8. The apparatus of claim 7 wherein said read address and said write address are the same address.

9. The apparatus of claim 7 wherein said read address and said write address are not the same address.

10. In a computer system for executing a computer program, a method for updating information within a microcode instruction that comprises a portion of the computer program without interrupting execution of said computer program, said microcode instruction contains an operation code field having operations code information add a data field having data field information, said method comprising the steps of:

storing said operations code information at an address within a first memory;

storing said data field information at an address within a second memory;

periodically accessing said operations code and said data field information to form a microcode instruction for use by said computer system; and altering, between periodic accesses to the first and second memory, said data field information stored in the second memory wherein said computer program execution is not interrupted to alter said data field information.

11. The method of claim 10 wherein said second memory is a dual-port memory unit.

12. The method of claim 10 wherein said step of storing said data field information and said step of altering said data field information occur within a single clock cycle of said computer system.

13. The method of claim 10 wherein said altering step further comprises the steps of:

applying a write address to a write address port of the second memory;

applying data field information to a data input port of the second memory; and applying, between periodic accesses to said said data field information within the second memory, a write enable signal to a write enable port of the second memory wherein said data field information is written to said write address to update data field information presently located at that write address.

14. The method of claim 13 further comprising the step of accessing, upon occurrence of a next periodic access to said memory unit, said new information.

15. The method of claim 14 wherein said altering step and said step of accessing the new information occur within a single clock cycle of said computer.

16. The apparatus of claim 1 wherein said first memory means is a single-port memory.

17. The method of claim 10 wherein said first memory is a single-port memory.

* * * * *